United States Patent [19]
Beiswanger et al.

[11] 3,839,210
[45] Oct. 1, 1974

[54] ANTIOXIDANT COMPOSITION COMPRISING A SYNERGISTIC MIXTURE OF A PHENOL, AMINE AND SULFONE

[75] Inventors: John P. G. Beiswanger, Audubon; Assadullah Nassry, Bethlehem, both of Pa.

[73] Assignee: GAF Corporation, New York, N.Y.

[22] Filed: Dec. 1, 1971

[21] Appl. No.: 203,848

[52] U.S. Cl.............. 252/47.5, 252/77, 252/402, 44/75, 44/76, 99/163
[51] Int. Cl............................................. C10m 1/38
[58] Field of Search............ 252/47.5, 51.5 R, 52 R, 252/402; 44/75, 76; 99/163

[56] References Cited
UNITED STATES PATENTS

| | | | |
|---|---|---|---|
| 2,225,533 | 12/1940 | Dewey | 252/52 A |
| 2,687,378 | 8/1954 | Goldschmidt et al. | 252/51.5 R |
| 2,809,164 | 10/1957 | Pruett | 252/51.5 R |
| 3,173,871 | 3/1965 | Elliott | 252/51.5 R |
| 3,250,713 | 5/1966 | Reinis | 252/51.5 R |
| 3,407,140 | 10/1968 | Chiddix et al. | 252/47.5 |

*Primary Examiner*—W. Cannon
*Assistant Examiner*—W. Cannon
*Attorney, Agent, or Firm*—Walter C. Kehm; Samson B. Leavitt

[57] ABSTRACT

An antioxidant composition comprising a mixture of an oil soluble phenol, an oil soluble amine and a long chain alkylthioethyl sulfone compound and oxidizable organic materials, particularly petroleum oil containing such antioxidant composition.

9 Claims, No Drawings

ANTIOXIDANT COMPOSITION COMPRISING A SYNERGISTIC MIXTURE OF A PHENOL, AMINE AND SULFONE

This invention relates to antioxidant compositions which may be used for stabilization of organic compounds, particularly petroleum oil which tends to deteriorate in storage or in use due to oxidation. It is well known that certain organic materials such as lubricating oils, fuels, edible oils, elastomers, plastics, synthetic resins, etc., are adversely affected by oxygen resulting in the formation of gums, discoloration, loss of physical properties such as tensile strength for resins, or elasticity for elastomers, loss of potency, rancidity and/or odor. Over a period of years there has been considerable research directed to remedying the poor resistance of these materials toward oxidation. A number of patents have issued which are directed to the purpose of preventing oxidative deterioration by providing a means for extending the useful life of these materials by using various types of oxidation inhibitors.

An object of the present invention is to provide an antioxidant composition which results in a total antioxidant effect that is greater than the sum of the effects of each ingredient thereof taken independently.

A specific object of this invention is to provide an antioxidant composition comprising a phenolic antioxidant, an amine and a sulfone compound.

A further object is to provide new stable compositions of matter by incorporating these novel antioxidant compositions into organic materials such as synthetic resins, plastics, fuels, elastomers, lubricating oils, turbine oil, motor oil and other materials susceptible to deterioration due to oxygen or related degradation processes.

Other objects of this invention will become more apparent as the disclosure proceeds.

The above objects may be readily accomplished by the preparation and use of a composite antioxidant composition comprising a sulfone compound, an amine and phenolic antioxidant. While the use of phenolic compounds as antioxidants is not new, it has now been found that the addition of a sulfone compound and amine to said phenolic antioxidant results in a surprising and totally greater effectiveness. While one would assume that the combination would result in an effectiveness that was equal to the arithmetical sum of the individual separate effects, it has now been discovered that the combined effectiveness is unexpectedly greater than the arithmetic sum of the three. In other words, by the addition of a sulfone compound to an amine and a phenolic compound a synergistic effect has been obtained.

In U.S. Pat. No. 3,407,140 the synergistic effect of a sulfone compound and a phenolic compound as an antioxidant combination has been disclosed. In accordance with the invention it has been found that the latter synergistic effect is still further increased by the addition of an amine.

More particularly, the instant invention may be defined as an antioxidant composition consisting essentially of a phenolic antioxidant, amine and a sulfone compound.

Phenolic compounds useful in this invention include any oil soluble phenol, and especially the alkylated phenols such as o-, m-, and p-cresol; phenols such as 2,4-di-t-butylphenol, bisphenols such as 4',4'-bis(2,6 di-t-butylphenol), 4, 4'-methylene bis(2,6-di-t-butylphenol); polyhydric phenols such as catechol, resorcinol and hydroquinone; cresols such as 2,6-di-t-butyl-4-methoxy phenol, 4',4' methylene bis (6-t-butyl-o-cresol); 4,4-thiobis (6-t-butyl-o-cresol); dihydroxyanthraquinones such as quinizarin, 2 n-dodecyl quinizarin; naphthol, and alkylated naphthol.

Typical examples of amines useful as components in the antioxidant synergistic system of the invention are N-arylnaphthylamines such as N-phenyl-α or β-naphthylamine, alkylated arylamines such as 4,4'-dioctyldiphenyl amine; aliphatic amines, in which the carbon chain length is between $C_4$–$C_{22}$; heterocyclic amines such as phenothiazine, quinoline, imidazolines, triazines, aromatic amines such as n-alkylated aniline, and long chain amines ethoxylated with an amount of ethylene oxide which is low enough to maintain solubility of the ethoxylated amine in oil.

As sulfone component, there are suitable the long chain alkylthioethyl sulfone compounds such as β-t-butylthioethylsulfone, β-n-dodecylthioethyl-n-dodecyl sulfone, β-t-dodecylthio-β'-t octylthiodiethyl sulfone, β-n-octadecylthioethyl-n-octadecyl sulfone, β-t-dodecylthioethyl-t-dodecyl sulfone, β-cyclohexylthioethyl cyclohexyl sulfone, bis-β-b-dodecylthioethyl sulfone, bis-β-t-octylthioethyl sulfone, bis-β-n-hexadecylthioethyl sulfone, bis-β-t-butylthioethyl-t-butyl sulfone and bis-β-t-octylthioethyl sulfone. Bis-β-t-dodecylthioethyl sulfone is an example of a preferred sulfone for use in preparing the antioxidant composition of the invention.

The sulfones are not new materials and their preparation is well known and has been described for instance in U.S. Pat. No. 3,407,140.

The amount of phenol, amine and sulfone, compounds present in the synergistic antioxidant composition of this invention is not critical for it is obvious that a different ratio may be optimum in each application. However, the ratios will fall within the following ranges.

| Component | Broad Range | Preferred Range |
| --- | --- | --- |
| Sulfone | 0.025 – 5% | 0.05 – 0.1% |
| Phenol | 0.025 – 5% | 0.05 – 0.5% |
| Amine | .0.025 – 0.5% | 0.05 – 0.1% |

The novel antioxidant compositions of this invention find utility in a large variety of applications that deal with organic materials susceptible to oxidative deterioration and related degradation. For example, the instant antioxidant compositions show excellent antioxidant activity in hydraulic fluids, automotive transmission fluids, transformer oils, turbine oils, metal working oils, gear oils, lubricating oils, petroleum waxes, greases, gasoline, diesel fuel, glass annealing oils, natural fats and oils, hydrogenated fats and oils, soaps derived from monocarboxylic acids and polybasic acids, polyalkylene glycol lubricants such as ethylene oxide-propylene oxide copolymers and the like.

Synthetic lubricants which can be protected include, alkyl oxalates, malonates, succinates, adipates, pimelates, suberrates, azelates, sebacates, esters from polyols such as pentaerythritol, trimethylol propane, sorbitol, alkyl esters of aliphatic monocarboxylic acids such as lauric, oleic, palmitic, stearic and behenic acids. Other lubricants include silicone lubricants such as polysiloxane oils and greases of the type of polyalkyl, polyaryl, polyalkoxy, polyaryoxy such as polydimethoxyphenoxy siloxane, silicate ester oils such as tetraalkoxy and tetraayloxysilanes and halogen substituted siloxanes and the like as well as fluorocarbon lubricants such lubricants such as $(-CF_2CFCl-)_n$ where n = an integer.

Phosphate esters such as

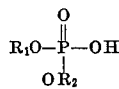

wherein R, $R_1$, and $R_2$ each represent hydrogen, phenyl, alkylphenyl, or an alkyl radical such as butyl, octyl, lauryl, oleyl, palmityl, and the like, can also be protected in accordance with the invention.

Other lubricants include synthetic base greases formed by mixing a soap with an oil, soaps derived from animal, vegetable, fats, fatty acids, wool grease, rosin or petroleum acids, for instance lead oelate, lithium stearate and the like.

Fuels that may be protected by this invention include gasoline, jet fuel, diesel fuel, kerosine and fuel oil, etc.

The novel synergistic antioxidant composition of this invention may be added to the organic material that is to be preserved in any manner. For example, the antioxidant composition comprising the three components may be diluted with any suitable mutual solvent prior to use or added without dilution directly to the material to be protected. Moreover, the ingredients that is sulfone compound, amine and phenolic compound of the antioxidant composition may be added separately to the material that is to be protected. Examples of suitable mutual solvents are propylene glycol, glycerine, glycerides, liquid fats, purified mineral oil, xylene, nonylbenzene, ethylacetate, butylacetate, methylisobutylketone and the like.

The following examples are given in order to illustrate the invention, such examples are not however to be taken as limiting or otherwise imposing any restrictions on the invention.

| 5.00 | grams | of a 1.0% solution of 2,6 di-t-butyl phenol in Shell 100 Neutral Oil |
| 5.00 | grams | of a 1.0% solution of bis-β-t-dodecylthioethyl sulfone in Shell 100 Neutral Oil |
| 5.00 | grams | of a 1.0% solution of phenyl-α-naphthylamine in Shell 100 Neutral Oil |
| 35.00 | grams | of Shell Neutral Oil |
| 50.00 | grams | total weight. |

This was then shaken at room temperature.

A sample composed of 50g petroleum oil containing the antioxidant and 5 ml of distilled water was introduced into a rotary bomb and the induction period of the oil sample determined. The results are set out in Table I which follows.

EXAMPLE 2

Oils samples containing 0.1% bis-β-t-dodecylthioethylsulfone, 0.1% 2,6 di-t-butyl-p-cresol, 0.1% dioctyl diphenylamine were prepared.

Then a 99.7% Shell 100 Neutral Oil was prepared by introducing into a bottle:

| 5.00 | grams | of a 1.0% solution of 2,6 di-t-butyl-p-cresol in Shell 100 Neutral Oil |
| 5.00 | grams | of a 1.0% solution of bis-β-t-dodecylthioethyl sulfone in Shell 100 Neutral Oil |
| 5.00 | grams | of a 1.0% solution of dioctyl diphenylamine in Shell 100 Neutral Oil |
| 35.00 | grams | of Shell 100 Neutral Oil |
| 50.00 | grams | total weight. |

This was then shaken at room temperature.

A sample of 50 g of test oil containing the antioxidant as just described and 5 ml of distilled water was then placed in a rotary bomb and the induction period of the oil sample determined. The results are set out in Table 1 which follows.

Additional oil samples containing the three component antioxidant systems were prepared in the same manner as described in connection with Examples 1 and 2.

Table 1 which follows sets out the induction periods of the oils containing 0.05–0.1% N-phenyl-α-naphthylamine, 0.05–0.1% 2,6 di-t-butylphenol and 0.05–0.1% bis-β-t-dodecylthioethylsulfone.

Table 1

Induction Periods 2,6 di-t-butylphenol, N-phenyl-α-naphthylamine and bis-β-t-dodecylthioethylsulfone

| Additive | | | | | | | | |
|---|---|---|---|---|---|---|---|---|
| 2,6 di-t-butyl phenol | .1 | 0 | .1 | 0 | .05 | 0 | .05 | 0.1 |
| N-phenyl-α-naphthylamine | 0 | .1 | .1 | 0 | 0 | 0 | .05 | 0 |
| bis-β-t-dodecylthioethyl-sulfone | 0 | 0 | .1 | .1 | 0 | .05 | .05 | 0.1 |
| Induction Period, Min. | 131 | 183 | 545 | 37 | 78 | 32 | 300 | 225 |

EXAMPLE 1

An antioxidant composition was prepared consisting of 0.1%, 2,6 di-t-butylphenol, 0.1% bis-β-t-dodecylthioethylsulfone and 0.1% phenyl-α-naphthylamine.

In order to demonstrate the increased antioxidant protection provided by this antioxidant composition for a lubricating oil, the standard rotary bomb oxidation Test time (ASTM D2272–64%) was carried out as follows:

99.7% Shell 100 Neutral Oil then was prepared by introducing into a bottle:

The induction period of the oil containing 0.1% 2,6 di-t-butylphenol is 131 minutes. The induction period of the oil sample containing 0.1% N-phenyl-α-naphthylamine is 183 minutes. The sum of the induction periods for these 2 oil samples is 314 minutes. The induction period of the oil sample containing 0.1% bis-β-t-dodecylthioethylsulfone is 37 minutes. The sum of these three induction periods is 351 minutes. However, when all three materials are present in the oil (at equivalent concentrations) the induction period is 545 minutes (average of 2 runs). This induction period is 194 minutes longer than that obtained with the three individual oil samples. This larger than expected increase in induction period shows that bis-β-t-dodecylthioethylsulfone acts in a synergistic manner when it is used in combination with 2,6, di-t-butyl phenol and phenyl-α-naphthylamine.

When the concentration of additives is cut in half to 0.05 percent, the synergistic antioxidant qualities of the bis-β-t-dodecylthioethylsulfone is still apparent. For example the sum of the individual induction periods of the oil containing 0.05 percent of the additives is 222 minutes. The oil sample containing all 3 additives has an induction period of 300 minutes.

In Table 2, there is set out the induction periods of oils containing 0.1% 2,6 di-t-butyl phenol, 0.1% dioctyl diphenylamine, and 0.1% 2,6 di-t-butyl phenol +0.1% dioctyl diphenylamine + 0.1% bis-β-t-dodecylthioethylsulfone.

Table 2

Induction Periods 2,6 di-t-butyl phenol, dioctyl diphenylamine and bis-β-t-dodecylthioethylsulfone.

| Additive | | | | |
|---|---|---|---|---|
| 2,6 di-t-butyl phenol | .1 | 0 | .1 | 0 |
| 4,4'-Dioctyldiphenylamine | 0 | .1 | .1 | 0 |
| bis-β-t-dodecylthioethylsulfone | 0 | 0 | .1 | .1 |
| Induction Period | 131 | 33 | 363 | 37 |

The induction period of the oil sample containing 0.1% 2,6 di-t-butylphenol is 131 minutes. The induction period of the oil sample containing 0.1% dioctyl diphenylamine is 33 minutes. The induction period of the oil sample containing 0.1% bis-β-t-dodecylthioethylsulfone is 37 minutes. The sum of these three individual induction periods is 201 minutes. However, the induction period for an oil sample containing all three materials in the same concentrations is 363 minutes. This is an increase of 162 minutes in induction period.

The larger than expected increase in induction period obtained by the addition of bis-β-t-dodecylthioethylsulfone to the oil is evidence that this material performs as a synergist when used in combination with 2,6 di-t-butylphenol and dioctyl diphenylamine.

In Table 3, there is shown the induction periods for oils containing 0.1% 2,6 di-t-butyl-p-cresol, 0.1% n-phenyl-α-naphthylamine, and 0.1% 2,6 di-t-butyl-p-cresol +0.1% n-phenyl-α-naphthylamine + 0.1% bis-β-t-dodecylthioethylsulfone.

The induction period of the oil sample containing 0.1% 2,6 di-t-butyl-p-cresol is 65 minutes. The induction period of the oil sample containing 0.1% phenyl-α-naphthylamine is 183 minutes and the induction period of the oil sample containing 0.1% bis-β-t-dodecylthioethyl-sulfone is 37 minutes. The sum of the individual induction periods of the oil samples containing 0.1% 2,6 di-t-butyl-p-cresol and 0.1% bis-β-t-dodecylthioethyl-sulfone to this oil increases the induction period to 578 minutes. An increase of 330 minutes. This large increase in induction time shows the synergistic qualities of bis-β-t-dodecylthioethylsulfone when it is used in combination with 2,6 di-t-butyl-p-cresol and N-phenyl-α-naphthylamine.

In Table 4 there is set out the induction periods for oils containing 0.1% 2,6 di-t-butyl-p-cresol, 0.1% dioctyl diphenylamine, and 0.1% 2,6 di-t-butyl-p-cresol + 0.1% dioctyl diphenylamine + 0.1% bis-β-t-dodecylthioethylsulfone.

Table 4

Induction Periods of Oils Containing 0.1% 2,6 di-t-butyl-p-cresol, 0.1% dioctyl diphenylamine and 0.1% bis-β-t-dodecylthioethylsulfone

| Additive | Percent Additive in Oil | | | |
|---|---|---|---|---|
| 0.1% 2,6 di-t-butyl-p-cresol | .1 | 0 | .1 | 0 |
| 0.1% dioctyl diphenylamine | 0 | .1 | .1 | 0 |
| 0.1% bis-β-t-dodecylthioethylsulfone | 0 | 0 | .1 | .1 |
| Induction Period, Min. | | | | |

The induction period of an oil containing 0.1% 2,6 di-t-butyl-p-cresol is 65 minutes. The induction period of an oil containing 0.1% dioctyl diphenylamine is 33 minutes and the induction period of an oil containing 0.1% bis-β-t-dodecylthioethylsulfone is 37 minutes. The sum of the 2 induction periods of the oil samples containing 2,6 di-t-butyl-p-cresol and dioctyl diphenylamine is 98 minutes. However, when 0.1% bis-β-t-dodecylthioethylsulfone is combined with these two materials the induction period is 125 minutes longer Table 3

Induction Periods 2,6 di-t-butyl p-cresol, dioctyl diphenylamine and bis-β-t-dodecylthioethylsulfone

| Additive | Percent Additive in Oil | | | |
|---|---|---|---|---|
| 0.1% 2,6 di-t-butyl-p-cresol | .1 | 0 | .1 | 0 |
| 0.1% N-phenyl-α-naphthylamine | 0 | .1 | .1 | 0 |
| 0.1% bis-β-t-dodecylthioethyl-sulfone | 0 | 0 | .1 | .1 |
| Induction Period, Min. | 65 | 183 | 578 | 37 | than the sum of the three induction periods for the three individual oils.

This increase of 125 minutes in induction period obtained as a result of adding 0.1% bis-β-t-dodecylthioethylsulfone to the oil samples containing 0.1% 2,6 di-t-butyl-p-cresol and 0.1% dioctyl diphenylamine demonstrates the synergistic activity of bis-β-t-dodecylthioethylsulfone when used in combination with the other two additives.

What is claimed is:

1. An antioxidant composition consisting essentially of a phenolic antioxidant selected from the group consisting of O-, M-, and p-cresol, 2,4-di-t-butylphenol, 4-',4'-bis(2,6-di-t-butylphenol), 4',4'-methylene bis-(2,6-di-t-butylphenol), catechol, resorcinol, hydroquinone, 2,6-di-t-butyl-4-methoxyphenol, 4',4'-methylene bis-(6-t-butyl-O-cresol), 4,4-thiobis-(6-t-butyl-o-cresol), quinizarin, 2-n-dodecyl quinizarin and naphthol, and amine selected from the group consisting of N-phenyl-α-naphthylamine, N-phenyl-β-naphthylamine, and 4,4'-dioctyl-diphenyl amine, and a sulfone compound selected from the group consisting of bis-β-t-dodecylthioethyl sulfone, β-t-butylthioethylsulfone, β-n-dodecylthioethyl-n-dodecyl sulfone, β-t-dodecylthio-β'-t-octylthiodiethyl sulfone, β-n-octadecylthioethyl-n-octadecyl sulfone, β-t-dodecylthioethyl-t-dodecyl sulfone, β-cyclohexylthioethyl cyclohexyl sulfone, bis-β-b-dodecylthioethyl sulfone, bis-β-t-octylthioethyl sulfone, bis-β-n-hexadecylthioethyl sulfone, bis-β-t-butylthioethyl-t-butyl sulfone and bis-β-t-octylthioethyl sulfone wherein the ratio of phenolic antioxidant to sulfone to amine compound lies within the range of 1 – 100: 1 – 100: 1 – 100.

2. An antioxidant composition according to claim 1 consisting essentially of a phenol antioxidant, an amine and a sulfone compound wherein the ratio of phenolic antioxidant to sulfone to amine compound lies within the range of 1 – 20: 1 – 10: 1 – 2.

3. An antioxidant composition according to claim 1 consisting essentially of 2,6 di-t-butyl-phenol, N-phenyl-α-naphthylamine and bis-β-t-dodecylthioethylsulfone.

4. An antioxidant composition according to claim 1 consisting essentially of 2,6 di-t-butylphenol, 4,4'-dioctyldiphenylamine and bis-β-t-dodecylthioethylsulfone.

5. An antioxidant composition according to claim 1 consisting essentially of 2,6 di-t-butyl-p-cresol, dioctyldiphenylamine and bis-β-t-dodecylthioethylsulfone.

6. An organic hydrocarbon material susceptible to oxidative deterioration selected from the group consisting of hydraulic fluids, automotive transmission fluids, transformer oils, turbine oils, metal working oils, gear oils, lubricating oils, petroleum waxes, greases, gasoline, diesel fuel, glass annealing oils, natural fats and oils, hydrogenated fats and oils, soaps derived from monocarboxylic acids and polybasic acids, and polyalkylene glycol lubricants protected against such deterioration by the inclusion therein of a small antioxidant quantity of an antioxidant composition as defined in claim 1.

7. The composition of claim 6 wherein the organic hydrocarbon material is a lubricating oil.

8. The composition of claim 6 wherein the organic hydrocarbon material is a hydraulic fluid.

9. The composition of claim 6 wherein the organic hydrocarbon material is a liquid fuel.

* * * * *